No. 789,360. PATENTED MAY 9, 1905.
E. O. DOAK.
CHECK ROW CORN PLANTER.
APPLICATION FILED SEPT. 23, 1904.
2 SHEETS—SHEET 1.
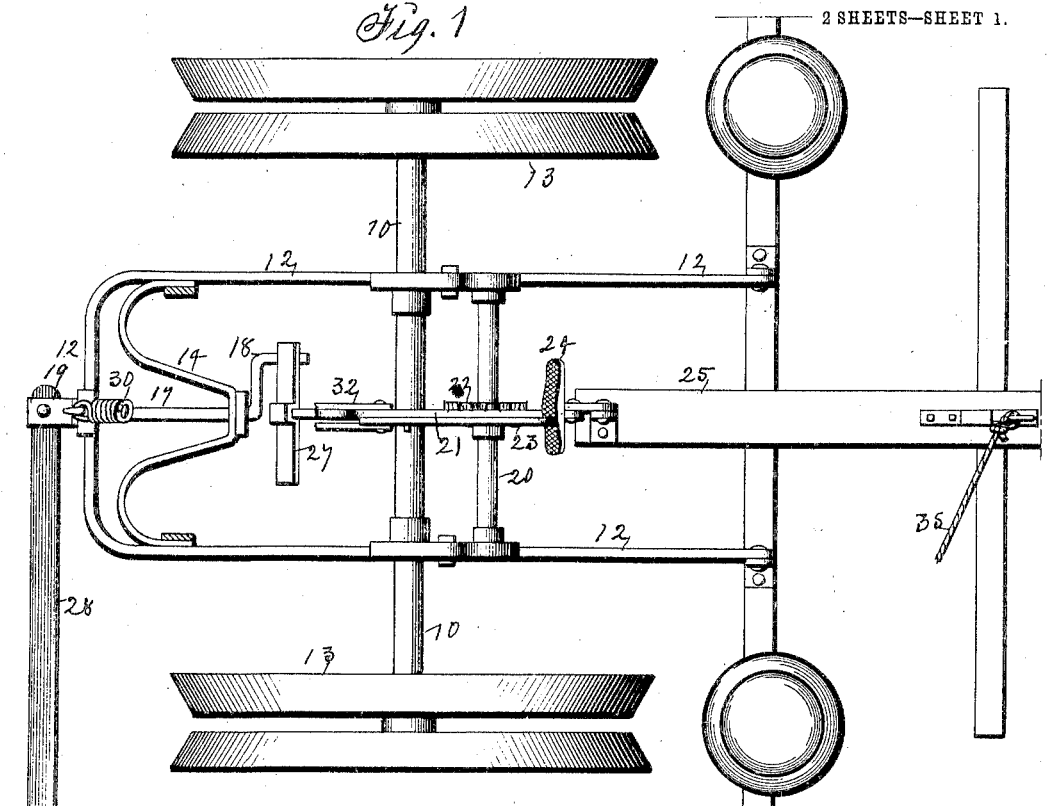
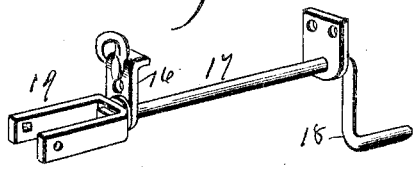
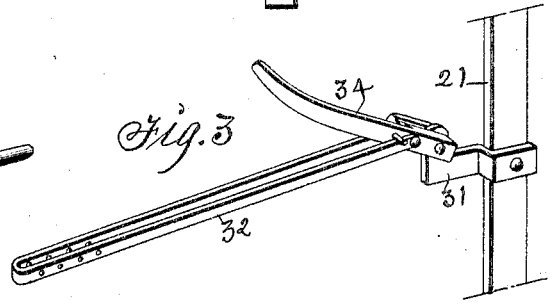
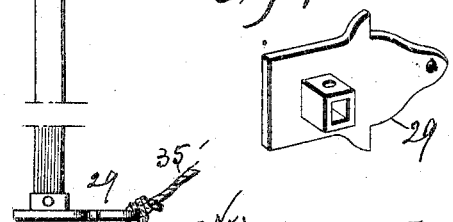
Witnesses: Inventor: Egbert O. Doak.
By Thomas G. Orwig, Attorney.

No. 789,360. PATENTED MAY 9, 1905.
E. O. DOAK.
CHECK ROW CORN PLANTER.
APPLICATION FILED SEPT. 23, 1904.

2 SHEETS—SHEET 2.

Witnesses:
J. R. Orwig.
R. L. Keibock

Inventor: Eglert O. Doak,
By Thomas G. Orwig. Attorney.

No. 789,360.

Patented May 9, 1905.

UNITED STATES PATENT OFFICE.

EGBERT O. DOAK, OF SAC CITY, IOWA.

CHECK-ROW CORN-PLANTER.

SPECIFICATION forming part of Letters Patent No. 789,360, dated May 9, 1905.

Application filed September 23, 1904. Serial No. 225,700.

*To all whom it may concern:*

Be it known that I, EGBERT O. DOAK, a citizen of the United States, residing at Sac City, in the county of Sac and State of Iowa, have invented a new and useful Improvement in Check-Row Corn-Planters, of which the following is a specification.

My object is to improve the construction and operation of a check-row corn-planter by providing simple, strong, and durable means for marking the ground with furrows extending parallel with the line of advance as the machine traverses a field from one end to the other.

My invention consists in the construction, arrangement, and combination of marking mechanism with a carriage and mechanism for elevating and retaining inoperative the runners, as hereinafter set forth, pointed out in my claims, and illustrated in the accompanying drawings, in which—

Figure 5:
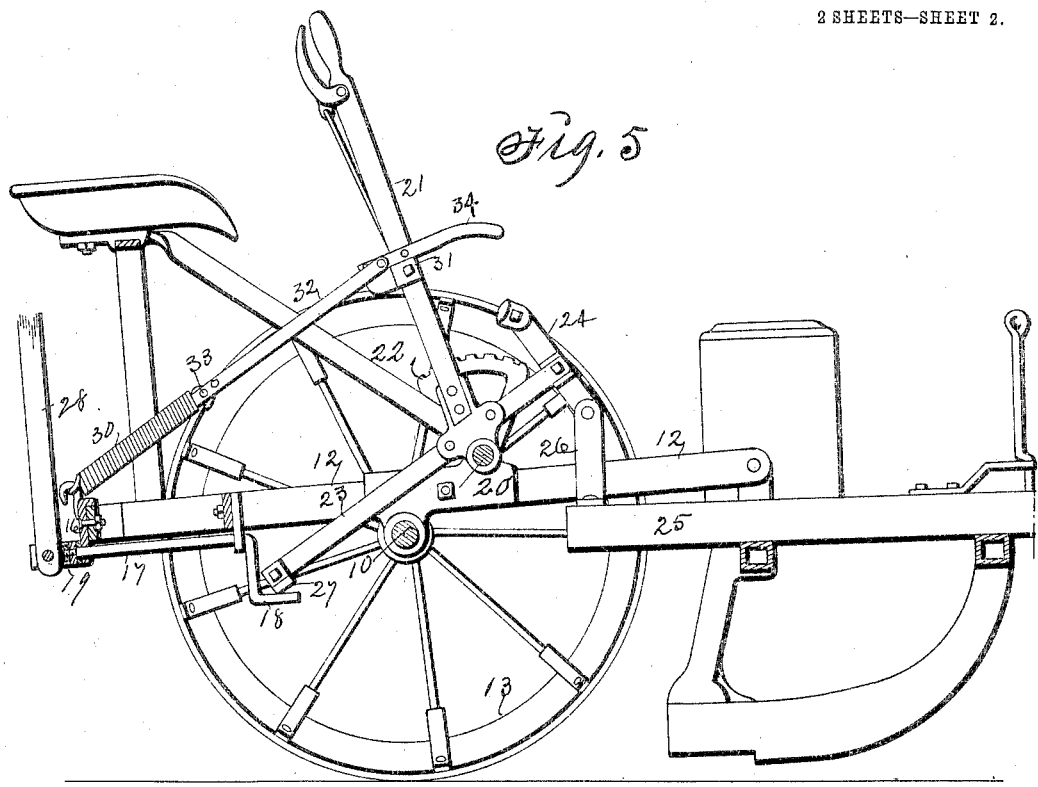
Figure 6:
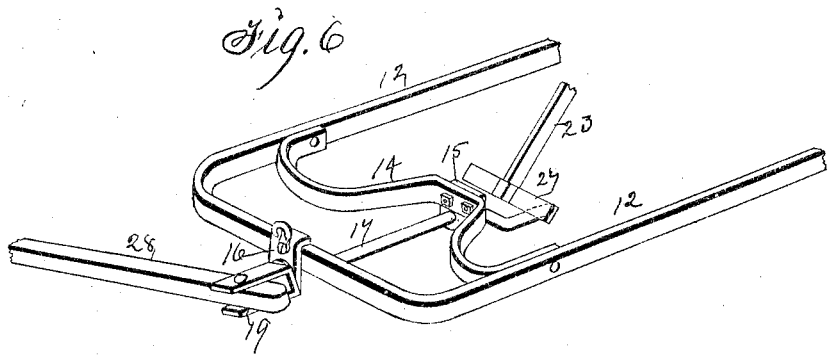

Figure 1 is a top plan view of the carriage adapted to be connected with runners in any suitable way and shows my marking mechanism and mechanism for elevating and retaining runners connected therewith in operative positions. Fig. 2 shows a crank-shaft in bearings adapted to be fixed to the carriage-frame and provided with means for connecting a spring and a marker-carrier therewith. Fig. 3 shows a device adapted for regulating the tension of a spring and connecting it with a lever that can be used for reversing the position of the marker relative to the carriage and for lifting the runners. Fig. 4 is a perspective view of the marker detached from the marker-carrier. Fig. 5 is a side view of the planter, partly in section, and shows the positions of my operative parts relative to each other and the runners. Fig. 6 is a perspective view that shows the rear end portion of the carriage-frame and means for connecting the crank-shaft therewith as required for practical use.

The numeral 10 designates the carriage-axle, and 12 the carriage-frame, mounted upon traction-wheels 13 in any suitable way. An auxiliary frame 14, that may vary in shape as desired, is fixed within the rear portion of the frame 12, and a shaft-bearer 15 is fixed to its center in alinement with a shaft-bearer 16, fixed to the rear and center of the carriage-frame 12 to support a rock-shaft 17, that has an elbow-shaped crank 18 at its front end and a forked extension 19 formed on or fixed to its rear end, as shown or in any suitable way.

A cross-bar 20 is fixed to the parallel sides of the carriage-frame 12 and in front of the axle 10 and a lever 21 fulcrumed thereto to project upward, as shown in Fig. 5, and a rack 22 fixed to the cross-bar and a pawl connected with the lever to engage the rack as required for locking the lever to the cross-bar, as shown in Fig. 5 or in any suitable way. A lever 23 is fixed in a crossed position to the lower end of the lever 21 and a foot-rest 24 formed on or fixed to its upper end to serve as a treadle, and the lower end of the treadle is connected with the rear end of the carriage-pole 25 by a link 26 in such a manner that the rear end of the pole connected with the runners, as shown in Fig. 5, can be depressed by foot-pressure on the treadle as required to lower the runners into operative position on the ground.

A cross-head 27 is fixed to the rear and lower end of the lever 23 to engage the crank 18 on the front end of the crank-shaft 17 in such a manner that when the rear end of the lever 23 is depressed by the rearward movement of the lever 21 the cross-head 27 will actuate the crank-shaft as required for reversing the position of a marker-carrier 28, pivoted in the rear forked end of the crank-shaft. (Shown in Fig. 1.) A reversible marker-head 29 is fixed to the free end of the marker-carrier.

To automatically throw the marker-carrier from right to left, and vice versa, a coiled spring 30 is connected with the rear end of the carriage-frame 12 and also connected with the lever 21 by a bearer 31, fixed to the lever, and a bifurcated link 32, as shown in Fig. 3, in such a manner that when the lever 21 is pressed forward and locked to the rack 22 power will be stored in the spring, so that whenever the lever 21 is released the spring will resume its normal position and in so doing pull the lever 21 rearward, and thereby depress the rear end of the lever 23, that engages the crank 18 and actuates the shaft 17 as required to reverse the position of the marker-carrier 28.

To regulate the tension of the spring 30, the rear end of the link 32 is provided with a plurality of perforations, through which a movable bolt 33 is passed for adjustably connecting the spring with the link.

To release the lever 21 from the force of the spring 30 and to operate jointly the levers 21 and 23 by foot-pressure upon the treadle 24 or by hand-pressure upon the lever 21 or by simultaneous hand and foot pressure as required to press the runners to enter the ground, a lever 34 is pivoted to the bearer 31, and the link 32 is pivoted to the lever in such a manner that when the lever 34 is turned upward and rearward the connection between the spring 30 and the lever 21 will be lengthened as required to prevent the spring from resisting the forward motion of the lever 21.

A rope 35 is fixed to the marker 29 and to the front and center of the runner-frame in such a manner that it will keep the marker-carrier 28 in right-angled position relative to line of advance when the marker is in operation.

Having thus set forth the purposes of my invention and the construction and function of the different elements and subcombination and the arrangement and combination of all the parts, the practical operation and utility of the invention will be readily understood by farmers and others familiar with the art to which it pertains.

What I claim as new, and desire to secure by Letters Patent, is—

1. In a corn-planter, a rock-shaft provided with an elbow-shaped crank at one end and means for connecting a marker-carrier with its other end, in combination with the rear end and center of a carriage-frame, to operate in the manner set forth for the purposes stated.

2. In a corn-planter, an auxiliary frame fixed within the rear end of a carriage-frame and provided with a shaft-bearing at its center, a shaft-bearing fixed to the rear and center of the carriage-frame, a rock-shaft provided with an elbow-shaped crank at its front end, a marker-carrier fixed to the rear end of the rock-shaft and means to actuate the rock-shaft, arranged and combined to operate in the manner set forth, for the purposes stated.

3. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, arranged and combined to operate in the manner set forth for the purposes stated.

4. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a treadle connected with the front end of the second lever and the treadle connected with rear end of a pole fixed to the runner-frame and the runner-frame pivotally connected with the front end of the carriage-frame, arranged and combined to operate in the manner set forth for the purposes stated.

5. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a treadle connected with the front end of the second lever and the treadle connected with rear end of a pole fixed to the runner-frame and the runner-frame pivotally connected with the front end of the carriage-frame and means to lock the two levers jointly to the carriage-frame, arranged and combined to operate in the manner set forth for the purposes stated.

6. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a coil-spring fixed to the rear and center of the carriage-frame and pivotally connected with the first lever, arranged and combined to operate in the manner set forth for the purposes stated.

7. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a coil-spring fixed to the rear and center of the carriage-frame and pivotally connected with the first lever and means for regulating the tension of the spring, arranged and combined to operate in the manner set forth for the purposes stated.

8. In a corn-planter, a rock-shaft in bear ings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a coil-spring fixed to the rear and center of the carriage-frame and pivotally connected with the first lever and means for adjusting the spring relative to the first lever, arranged and combined to operate in the manner set forth for the purposes stated.

9. In a corn-planter, a rock-shaft in bearings at the rear and center of the carriage-frame provided with an elbow-shaped crank at its front end, a lever fulcrumed to the carriage-frame in front of the carriage-axle, a second lever fixed across the lower end of the first lever and provided with a cross-head at its rear end to engage the elbow-shaped crank of the rock-shaft, a coil-spring fixed to the rear and center of the carriage-frame and pivotally connected with the first lever by means of a link, a bearer fixed to the first lever and a small lever pivoted to the bearer and to the end of the link, arranged and combined to operate in the manner set forth for the purposes stated.

10. In a corn-planter, a carriage-frame pivotally connected with a runner-frame, a lever fulcrumed to the central part of the carriage-frame in front of the axle, a rack and pawl for locking the lever, a second lever fixed across the lower end portion of the first lever, a treadle fixed to the front end of the second lever and connected with the rear end of a pole fixed to the runner-frame, a cross-head on the rear end of the second lever, a rock-shaft in bearings on the rear and center of the carriage-frame provided with an elbow-shaped crank at its front end, a marker-carrier connected with the rear end of the rock-shaft, a marker on the free end of the carrier, a rope connected with the carrier and the runner-frame, a coil-spring connected with the rear and center of the carriage-frame and adjustably connected with the first lever, all arranged and combined to operate in the manner set forth for the purposes stated.

EGBERT O. DOAK.

Witnesses:
J. H. STONER,
W. H. HART.